United States Patent
Mottay et al.

(10) Patent No.: US 8,310,749 B2
(45) Date of Patent: Nov. 13, 2012

(54) ULTRA-SHORT HIGH-POWER LIGHT PULSE SOURCE

(75) Inventors: Eric Mottay, Begles (FR); Patrick Georges, Noisy le Roi (FR); Yoann Zaouter, Bordeaux (FR); Marc Hanna, Limours (FR); Dimitris Papadopoulos, Athenes (GR); Frederic Druon, Orsay (FR); Eric Cormier, Cestas (FR)

(73) Assignees: Amplitude Systemes, Pessac (FR); Institut d'Optique Graduate School, Palaiseau (FR); Centre National de la Recherche Scientifique, Paris (FR)

( * ) Notice: Subject to any disclaimer, the term of this patent is extended or adjusted under 35 U.S.C. 154(b) by 436 days.

(21) Appl. No.: 12/664,754

(22) PCT Filed: Jun. 13, 2008

(86) PCT No.: PCT/FR2008/051065
§ 371 (c)(1),
(2), (4) Date: Dec. 15, 2009

(87) PCT Pub. No.: WO2009/004232
PCT Pub. Date: Jan. 8, 2009

(65) Prior Publication Data
US 2010/0188733 A1    Jul. 29, 2010

(30) Foreign Application Priority Data
Jun. 15, 2007 (FR) .................... 07 55798

(51) Int. Cl.
*H04B 10/17* (2006.01)
*H01S 3/102* (2006.01)

(52) U.S. Cl. ............... 359/341.3; 359/337.1; 359/341.1; 372/25

(58) Field of Classification Search ............... 359/337.1, 359/341.1, 341.3; 372/25
See application file for complete search history.

(56) References Cited

U.S. PATENT DOCUMENTS 7,167,300 B2    1/2007 Fermann et al.
(Continued)

FOREIGN PATENT DOCUMENTS

WO    2006/057655 A    6/2006
(Continued)

OTHER PUBLICATIONS

Limpert J et al, "High-power femtosecond Yb—doped fiber amplifier" Optics Express' Opt. Soc. America USA, Jul. 15, 2002, vol. 10, No. 14, XPOO2479265.
(Continued)

*Primary Examiner* — Eric Bolda
(74) *Attorney, Agent, or Firm* — Young & Thompson

(57) ABSTRACT

An ultra-short high-power light pulse source including a first laser pump source (1), a mode-locked laser oscillator (2), a second laser pump source (4), a waveguide (6) capable of inserting spectral phases into the light pulses, and a compressor (8) capable of generating predetermined spectral phases into the light pulses. The waveguide (6) includes an element capable of compensating the predetermined spectral phases generated at least by the compressor (8), the second laser pump source (4) being capable of delivering a second pump light flow (5) having a power $P_L$ such that the spectral phases generated by the wave guide (6) are opposed or quasi opposed to the predetermined spectral phases generated by the compressor (8) in order to generate compressed ultra-short light pulses (9) at the output of the compressor (8) with a planar or quasi planar spectral phase.

15 Claims, 4 Drawing Sheets

U.S. PATENT DOCUMENTS

| | | | |
|---|---|---|---|
| 7,414,780 B2 * | 8/2008 | Fermann et al. | 359/337 |
| 2005/0163426 A1 * | 7/2005 | Fermann et al. | 385/37 |
| 2006/0159137 A1 * | 7/2006 | Shah | 372/25 |
| 2007/0177643 A1 * | 8/2007 | Liu | 372/30 |
| 2008/0130099 A1 * | 6/2008 | Harter | 359/341.1 |
| 2009/0128892 A1 * | 5/2009 | Wise et al. | 359/341.1 |

FOREIGN PATENT DOCUMENTS

| | | |
|---|---|---|
| WO | 2006/113507 A | 10/2006 |

OTHER PUBLICATIONS

Soh D B S et al, "Efficient femtosecond pulse generation using a parabolic amplifier combined with a pulse compressor. I. Stimulated Raman-scattering effects", Journal of the Optical Society of America B (Optical Physics) Opt. Soc. America USA, Jan. 2006, pp. 1-9, vol. 23, No. 1, XP002479266.

International Search Report in Corresponding Application No. PCT/FR2008/051065 dated Feb. 5, 2009.

* cited by examiner

ULTRA-SHORT HIGH-POWER LIGHT PULSE SOURCE

The present invention relates to a source of high-power ultrashort light pulses.

Ytterbium-doped optical fibers are widely used in ultrashort light pulse sources. They offer several advantages for generating and amplifying ultrashort light pulses, and have become an attractive alternative to the conventional systems based on the propagation in free space. In particular, they show excellent thermo-optical properties, wide gain spectral band (>40 nm), high saturation fluence (energy divided by the surface), allowing generation of millijoule-energy pulses, and high optical efficiency (>80%).

On the other hand, the confinement of light in the fiber core, associated with large propagation lengths, favors the non-linear effects that deteriorate the light pulses, thus limiting the power and energy increase of the sources of high-peak-power ultrashort light pulses of the prior art.

A first solution for limiting these effects is to distribute the optical intensity in the space, i.e. to design fibers having a very large effective area while staying monomode, to keep the excellent spatial quality of the light beam. This solution is described in J. Limpert, A. Liem, M. Reich, T. Schreiber, S. Nolte, H. Zellmer, A. Tünnermann, J. Broeng, A. Petersson and C. Jakobsen, "Low-nonlinearity single-transverse-mode ytterbium-doped photonic crystal fiber amplifier", Opt. Express 12, 1313-1319 (2004). This solution is associated with the use of a time-stretching technique to reduce the peak-power associated with the light pulse.

This technique is called "Chirped-Pulse Amplification" (CPA). This solution is described in D. Strickland and G. Mourou, "Compression of amplified chirped optical pulses", Opt. Commun. 56, 219-221 (1985), and has been first used in the context of picosecond-pulses amplifiers based on neodymium-doped glass and for femtosecond-pulses in titanium-doped sapphire crystals ($Ti^{3+}:Al_2O_3$). It consists in time-stretching the light pulses by means of a dispersive optical system, which allows reducing the light-pulse peak-power, so as to allow the use of an amplifier in the linear regime. The amplified light pulses are then compressed by a second dispersive optical system, which introduces a spectral phase that is exactly the opposite of that of the stretcher. Using this technique in the framework of optical-fiber amplifiers has permitted generation of millijoule-energy subpicosecond light pulses and generation of high-mean-power femtosecond light pulses.

It is known that, in some cases, the non-linear effects that occur during propagation of the light flux in the amplifier can be tolerated or can even improve the performance of CPA systems. The design of these systems is based on a delicate balance between non-linear effects and dispersion in all the elements of the system: stretcher, amplifier, compressor. High-energy and high-peak-power CPA systems exist, which have a non-negligible non-linear phase accumulation ($\phi_{NL} > \pi$). Such systems are known by L. Shah, Z. Liu, I. Hartl, G. Imeshev, G. Cho and M. Fermann, "High energy femtosecond Yb cubicon fiber amplifier", Opt. Express 13, 4717-4722 (2005) and L. Kuznetsova, A. Chong and F. W. Wise, "Interplay of nonlinearity and gain shaping in femtosecond fiber amplifiers", Opt. Lett. 31, 2640-2642 (2006).

Generally, the linear or quasi-linear ytterbium-ion-doped-optical-fiber CPA systems are limited to generating pulses having a duration longer than 100 femtoseconds. This limitation is due to the effect of gain spectrum narrowing.

M. Fermann, A. Galvanauskas, D. J. Harter, "Modular high-energy widely-tunable ultrafast fiber source", U.S. Pat. No. 7,167,300 B2 (2007), discloses the possibility of applying a parabolic regime of amplification to the ytterbium-doped-optical-fiber amplifiers. The parabolic light pulses are the asymptotic solution of the non-linear Schrödinger equation that governs the propagation of light pulses in optical fibers, taking into account a constant spectral gain, the self-phase modulation (SPM), and a normal group-velocity dispersion (GVD). This is given by the following relation:

$$i\frac{\partial u}{\partial z} = \frac{\beta_2}{2}\frac{\partial^2 u}{\partial t^2} - \gamma |u|^2 u + i\frac{g}{2}u$$

where u is the complex field envelope, z is the distance along the fiber, t is the time variable, $\beta_2$ is the group-velocity dispersion, $\gamma$ is the non-linear coefficient of the fiber, $i=\sqrt{-1}$, and g is the lineal gain of the fiber.

The interaction between the self-phase modulation (SPM) and the normal group-velocity dispersion (GVD) in presence of gain results in a steady propagation regime that generates amplified light pulses with linear frequency drift. The speed of convergence toward this profile depends on the energy and duration of the incident light pulse.

A typical system based on the parabolic regime is made of an oscillator directly coupled to the fiber amplifier whose parameters (energy and duration of the input light pulses, dispersion, gain, length and non-linear parameter of the fiber) are adjusted to obtain a convergence of the light pulses toward the parabolic profile, and a compressor for compensating for the linear frequency drift acquired during the propagation of the light pulse.

One of the advantages of the parabolic regime is the light-pulse spectral broadening obtained in the fiber, which leads to a final light-pulse duration potentially shorter than that of the input light pulses, unlike the light-pulse durations obtained with a CPA. Moreover, there is no stretcher in such a system. A time stretching occurs in the amplifying optical fiber.

However, this ideal asymptotic solution is experimentally limited by additional spurious effects such as the finite gain-bandwidth of the amplifying medium, the higher dispersion orders, and the stimulated Raman scattering (SRS), as described in D. B. S. Soh, J. Nilsson and A. B. Grudinin, "Efficient femtosecond pulse generation using a parabolic amplifier combined with a pulse compressor. I. Stimulated Raman-scattering effects", J. Opt. Soc. Am. B. 22, 1-9 (2005). These additional effects limit the obtainable energy and the light-pulse quality obtained after recompression.

Accordingly, the object of the present invention is to propose a source of high-power ultrashort light pulses allowing compensation for the dispersions associated with the compression device, by dispersions associated with the amplifying optical fiber.

Such a light-pulse source allows obtaining high-peak-power ultrashort light pulses with a very high quality, a duration shorter than one hundred femtoseconds, and an energy that can reach 290 nJ.

The source of ultrashort light pulses permits to avoid the need of a time stretcher at the input of the amplifying optical fiber and to use a simple-design compressor, having no additional means to compensate for the dispersions.

Accordingly, the invention relates to a source of high-power ultrashort light pulses comprising:
 a first laser pump source adapted to deliver a first pump light flow,
 a mode-locked laser oscillator adapted to receive said first pump light flow and to deliver ultrashort input light pulses, said input light pulses having an input-pulse spectrum S1 with a bandwidth B1, a second laser pump source adapted to deliver a second pump light flow, a waveguide adapted to receive said second pump light flow and to amplify the input light pulses in a non-linear regime in order to introduce spectral phases in the input light pulses, generating ultrashort amplified light pulses, having an asymmetrical amplified-pulse spectrum S2 with a bandwidth B2, a compressor adapted to time-compress the amplified light pulses, said compressor generating predetermined spectral phases in the amplified light pulses.

According to the invention, the waveguide consists of a means adapted to compensate for the predetermined spectral phases generated at least by the compressor, the second laser pump source being adapted to deliver a second pump light flow having a power $P_L$ such that the spectral phases generated by the waveguide are opposed or quasi-opposed to the predetermined spectral phases generated by the compressor, in order to generate, at the output of the compressor, compressed ultrashort light pulses with a planar or quasi-planar spectral phase.

In various possible embodiments, the present invention also relates to the following characteristics, which may be considered either alone or in any technically possible combination and which each offer specific advantages:

the waveguide has a finite gain-spectrum S3 with a bandwidth B3, said waveguide being such that the bandwidth B1 of the input-pulse spectrum S1 is smaller than the bandwidth B3 of the finite gain-spectrum S3, and the bandwidth B2 of the amplified-pulse spectrum S2 being the same or almost the same as the bandwidth B3 of the gain spectrum S3 of the waveguide, the means adapted to compensate for the dispersions generated at least by the compressor compensates for the spectral phases of at least order 2 ($\phi_2$) and 3 ($\phi_3$), the waveguide adapted to amplify the input light pulses in a non-linear regime is an ytterbium-ion-doped amplifying optical fiber, said amplifying optical fiber having a length greater than the critical length $L_C$ beyond which the bandwidth B2 of the amplified-pulse spectrum S2 is the same or almost the same as the bandwidth B3 of the gain spectrum S3 of the waveguide, for a length L of the amplifying optical fiber equal to 6.5 m, the power $P_L$ of the second pump light flow of the second laser pump source is comprised between 15 W and 25 W, the first and second laser pump sources are laser diodes each delivering a power of 25 W, the mode-locked laser oscillator is a femtosecond oscillator comprising a resonant cavity with a length such that the repetition rate of said laser oscillator is 27 MHz, said mode-locked femtosecond laser oscillator delivering ultrashort input light pulses having a duration of the order of one hundred of femtoseconds and an energy that can reach 3.5 nJ, the length L of the ytterbium-ion-doped amplifying optical fiber is 6.5 m, said fiber having a signal core of 20 µm in diameter and a pump core of 400 µm in diameter, the compressor comprises two identical transmission gratings, each comprising 1250 lines/mm, the amplifying optical fiber is a polarization maintaining fiber, the amplifying optical fiber is a normal dispersion fiber, the amplifying optical fiber comprises a first portion of fiber having a critical length $L_C$ over which the input light pulses are transmitted in a parabolic regime, and a second portion of fiber over which the input light pulses are transmitted in a non-linear regime, the source of high-energy ultrashort light pulses comprises an optical modulator, arranged between the mode-locked laser oscillator and the waveguide, in order to reduce the repetition rate of the amplified light pulses at the output of said mode-locked laser oscillator, the source of high-energy ultrashort light pulses comprises an isolator, arranged downstream from the mode-locked laser oscillator.

The high-power ultrashort light pulses source according to the invention allows a best compression of the wideband light pulses that are generated.

In particular, the third-order spectral phase (TOD, "Third-Order Dispersion") of the compressor is compensated for by the asymmetrical non-linear phase accumulated in the fiber amplifier.

The non-linear regime allows the shaping of the input-light-pulse spectrum S1 by the finite gain-spectrum S3. The asymmetry of the finite gain-spectrum S3 is imparted to the input-light-pulse spectrum S1. The self-phase modulation to the stretched input light pulses produces an asymmetrical spectral phase.

The power $P_L$ of the second laser pump source may be adjusted so that this asymmetrical phase compensates for the third-order dispersion (TOD) introduced by the compressor.

This allows obtaining compressed light pulses with a very high temporal quality and a duration far shorter than it is possible to obtain with CPA systems of the prior art.

The source of ultrashort light pulses permits to avoid the need of a time stretcher at the input of the amplifying optical fiber and to use a simple-design compressor, having no additional means to compensate for the dispersions.

The source of high-power ultrashort light pulses according to the invention allows generation of light pulses having a duration of 63 fs, an energy of 290 nJ, a peak power of 4.6 MW, for a rate of 27 MHz and a wavelength of 1050 nm. This is a record of duration for light pulses that are generated from an ytterbium-doped-fiber amplifier, followed by a conventional grating compressor.

The invention will now be described with reference to the appended drawings, in which.

Figure 1:
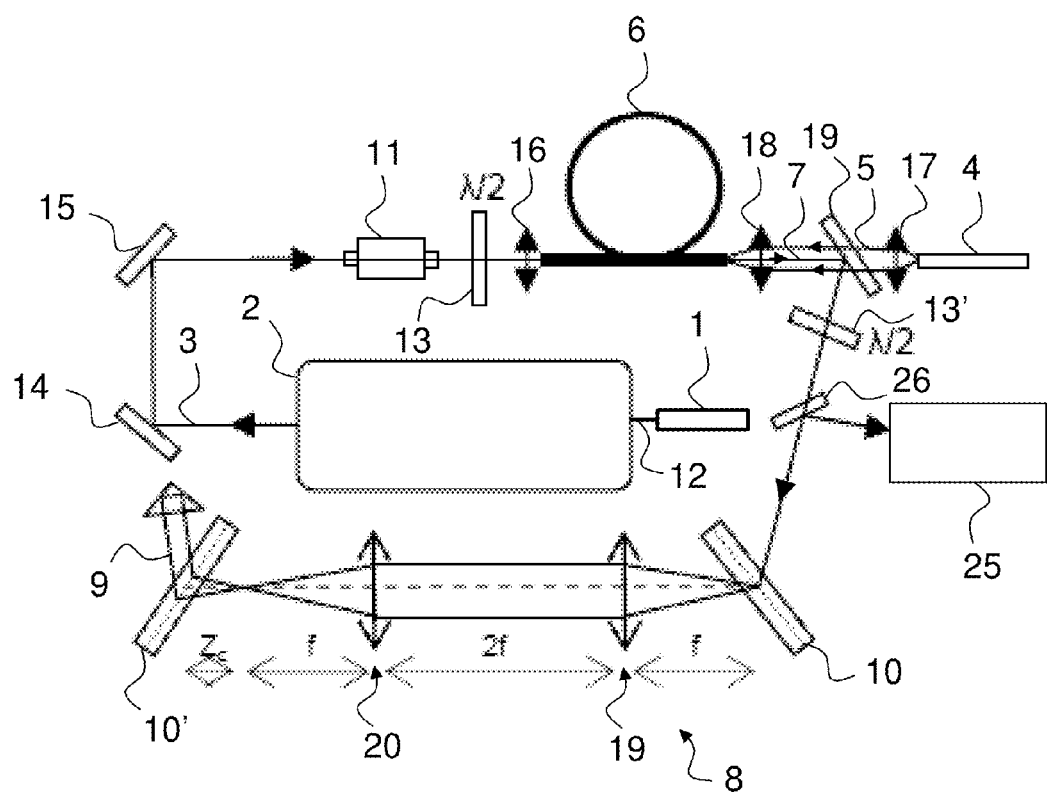
FIG. 1 shows a source of high-power ultrashort light pulses according to an embodiment of the invention.

The source of high-power ultrashort light pulses comprises a mode-locked laser oscillator 2. In the example of FIG. 1, the mode-locked laser oscillator 2 is a passive mode-locked femtosecond oscillator, comprising a saturable absorber formed by quantum wells. The saturable absorber is applied to a Bragg mirror made from a semiconductor. The gain medium is an ytterbium-ion-doped $CaGdAlO_4$ crystal.

The mode-locked laser oscillator 2 is pumped by a first laser pump source 1 adapted to deliver a first pump light flow 12. In the example of FIG. 1, the first laser pump source 1 is a fibered high-power InGaAs laser pump diode transmitting a power that reaches 25 W over an optical fiber of 100 µm in diameter, at the wavelength 980 nm. The pump light flow 12 is then collimated by a triplet with a focal length of 76 mm and focused into the crystal through a dichroic mirror with an identical triplet.

The mode-locked laser oscillator 2 operates at a repetition rate between 1 MHz and 1 GHz. In the example of FIG. 1, the repetition rate is 27 MHz.

The ultrashort input light pulses 3 generated by the mode-locked laser oscillator 2 have a duration of the order of one hundred of femtoseconds. The input light pulses 3 have an input-pulse spectrum S1 with a bandwidth B1. In the example of FIG. 1, the input light pulses 3 have a duration of 145 femtoseconds. The spectral bandwidth B1 of the input-pulse spectrum S1 is 15 nm, at the central wavelength of 1050 nm. The power delivered at the output of the mode-locked laser oscillator 2 is 95 mW. The energy of the input light pulses 3 is of the order of 3.5 nJ.

The source of high-power ultrashort light pulses comprises a waveguide 6 adapted to amplify the input light pulses 3 in a non-linear regime, in order to introduce spectral phases in the input light pulses 3. The waveguide 6 outputs ultrashort amplified light pulses 7 having an asymmetrical amplified-pulse spectrum S2 with a bandwidth B2.

The source of high-power ultrashort light pulses may comprise an optical modulator, arranged between the mode-locked laser oscillator 2 and the waveguide 6, in order to reduce the repetition rate of the amplified light pulses 7 at the output of the mode-locked laser oscillator 2.

In the example of FIG. 1, the waveguide 6 adapted to amplify the input light pulses 3 in a non-linear regime is an ytterbium-ion-doped amplifying optical fiber.

The mean power injected into the ytterbium-doped-fiber waveguide 6 is 55 mW (corresponding to an energy of 2 nJ per light pulse). This power may be higher than 55 mW.

The source of high-power ultrashort light pulses may comprise an isolator 11 arranged downstream from the mode-locked laser oscillator 2.

The input light pulses 3 are injected into the waveguide 6 through this isolator 11.

The source of high-power ultrashort light pulses may comprise mirrors 14 and 15 to steer the input light pulses 3 toward the mode-locked laser oscillator 2.

The amplifying optical fiber 6 may be a polarisation-maintaining fiber.

The source of high-power ultrashort light pulses may comprise a half-wave plate 13 arranged at the input of the waveguide 6. The half-wave plate 13 is used to control the polarisation state of the wave injected into the polarization-maintaining amplifying optical fiber 6.

The source of high-power ultrashort light pulses may also comprise a second half-wave plate 13' arranged at the output of the waveguide 6.

An aspherical lens 16 with a focal length of 18 mm may be used at the input of the amplifying optical fiber 6 to inject the input light pulses 3 into the core of the fiber. The latter advantageously has a dual-core structure with a large core for the light signal. The amplifying optical fiber 6 has a signal core of about 20 µm in diameter and a pump core of about 400 µm in diameter (Nufern PLMA-YDF-20/400). The amplifying optical fiber 6 is a monomode fiber in which monomode light signals are injected.

Any other geometry of ytterbium-doped amplifying optical fibers (single-core, dual-core, triple-core, large-mode, micro-structured, with or without polarization maintaining . . . ) may be used.

The length L of the ytterbium-ion-doped amplifying optical fiber 6 is advantageously 6.5 mm, as described hereinafter.

The amplifying optical fiber 6 is pumped in a counter-propagative configuration by a second laser pump source 4 adapted to deliver a second pump light flux 5. In the example of FIG. 1, the second laser pump source 4 is adapted to deliver a second pump light flow 5. In the example of FIG. 1, the second laser pump source 4 is a diode laser having a power equal to 25 W over 100 µm at 976 nm.

For this wavelength, the absorption of the second pump light flow 5 is 1.7 dB/m. The second pump light flow 5 is injected by means of two aspherical lenses 17, 18 with focal lengths of 15 mm and 8 mm, respectively. A first dichroic mirror 19 may be used to reflect the amplified light pulses 7 toward the compressor 8.

A second dichroic mirror 26 may also be used to extract the amplified light impulses 7 at the output of the amplifying optical fiber 6.

The two faces of the amplifying optical fiber 6 are cleaved at 8° to eliminate a possible spurious laser effect.

For a full pump power, the mean power at the output of the amplifying optical fiber 6 is 11.5 W. The amplified light pulses 7 are stretched up to a pulse duration of the order of 5.6 picoseconds. The bandwidth B2 of the amplified-pulse spectrum S2 is broadened up to 48.5 nm due to the dispersion and the self-phase modulation (SPM) in the amplifying optical fiber 6.

The source of high-power ultrashort light pulses comprises a compressor 8 adapted to time-compress the amplified light pulses 7. The compressor 8 introduces predetermined spectral phases in the amplified light pulses 7.

As used herein, "predetermined", when applied to spectral phases, means known spectral phases that are obtained either by measurement or by simulation, as described hereinafter.

The compressor 8 comprises a pair of identical Wasatch Photonics transmission gratings 10, 10', each having 1250 lines/mm, with a first grating 10 and a second grating 10'. The amplified light pulses 7 are incident on the first grating 10. The light beams associated with the amplified light pulses 7 are diffracted by the first grating 10, focused by two lenses 19, 20, and diffracted again by the second grating 10'. Compressed ultrashort light pulses 9 are obtained at the output of the compressor 8.

The two transmission gratings 10, 10' have a high efficiency of 93% in transmission, in an antiparallel configuration. The distance $z_c$, shown in FIG. 1, may vary between 5 and 10 mm. The focal length f is 150 mm. The global compression efficiency is 70%.

The compressor 8 is a dispersive system which may also be made of prisms, silica or hollow dispersion shifted fibers, dispersive mirrors, or bulk gratings.

In the source of ultrashort light pulses, several sources contribute to the generation of a spectral phase and, more particularly, of a third-order spectral phase (TOD, "Third-Order Dispersion"). There are actually three main sources that contribute to the generation of a third-order spectral phase (TOD).

Firstly, the amplifying optical fiber 6 contributes to the generation of a third-order spectral phase (TOD) by the third order of its propagation constant $\beta_3$. This propagation constant $\beta_3$ is mainly a function of the material forming the fiber core, which is the silica in the case of large-core optical fibers.

Secondly, the compressor 8 also contributes to the generation of a third-order spectral phase (TOD).

Unfortunately, the ratio between the third-order spectral phase (TOD) and the normal group-velocity dispersion (GVD) that is introduced by the amplifying optical fiber 6 has the opposite sign relative to the ratio between the third-order spectral phase (TOD) and the normal group-velocity dispersion (GVD) that is introduced by a grating compressor 8.

This means that if the compressor 8 is set to compensate for the normal group-velocity dispersion (GVD) of the amplifying optical fiber 6, the normal group-velocity dispersion (GVD) associated with the amplifying optical fiber 6 and the normal group-velocity dispersion (GVD) associated with the compressor 8 are then of opposite signs. The third-order spectral phases (TOD) of the amplifying optical fiber 6 and the compressor 8 add to each other because the respective spectral phases are of the same sign. This contributes to broaden and deform the final light pulse. This effect limits the duration and quality of the parabolic light pulses compressed by gratings.

The third source of third-order spectral phase (TOD) lies in the above-mentioned asymmetrical self-phase modulation (SPM, "Self-Phase Modulation"). In A. Galvanauskas, "Ultrashort-pulse fiber amplifiers", in "Ultrafast lasers" CRC, p. 209 (2002), it has been demonstrated that, in a regime of highly stretched pulses, the accumulated non-linear spectral phase is proportional to the spectral intensity. For ideal parabolic light pulses, the spectrum is symmetrical and thus does not lead to an odd-order spectral phase addition. On the other hand, if the spectrum is made asymmetrical by a spectral dependency of the asymmetrical gain, the contribution of this global effect to the third-order spectral phase (TOD) may be important. This effect has been used for CPA devices of the prior art, disclosed in L. Shah, Z. Liu, I. Hartl, G. Imeshev, G. Cho and M. Fermann, "High energy femtosecond Yb cubicon fiber amplifier", Opt. Express 13, 4717-4722 (2005).

In the source of ultrashort light pulses of the invention, the waveguide 6 consists of a means adapted to compensate for the predetermined spectral phases, generated at least by the compressor 8. The second laser pump source 4 is adapted to deliver a second pump light flow 5 with a power $P_L$ such that the spectral phases generated by the waveguide 6 are opposed or quasi-opposed to the predetermined spectral phases generated by the compressor 8, in order to generate, at the output of the compressor, compressed ultrashort light pulses 9 with a planar or quasi-planar spectral phase.

In a preferred embodiment of the invention, the waveguide 6 consists of a means adapted to compensate for the predetermined spectral phases, generated by the compressor 8 only.

In another preferred embodiment of the invention, the waveguide 6 is the only means adapted to compensate for the predetermined spectral phases, which allows the use of a conventional simple-design compressor.

In another embodiment of the invention, the waveguide 6 may be associated with other means for compensating for the predetermined spectral phases.

The predetermined spectral phases associated with the compressor 8 are determined before the compensation operation.

The waveguide 6, which, in the example of FIG. 1, consists of an amplifying optical fiber 6, has a finite gain-spectrum S3 with a bandwidth B3.

The waveguide 6 operates in a parabolic regime beyond the limit imposed by the finite gain-spectrum S3, but under the stimulated Raman scattering threshold.

In this regard, the invention goes against the established idea according to which the quality of the light pulses obtained deteriorates when the limit imposed by the finite gain-spectrum S3 of the waveguide 6 is exceeded.

On the contrary, it permits a best compression of the amplified light pulses 7 that have a wide spectral bandwidth S2.

In particular, the third-order spectral phase (TOD) introduced by the compressor 8 is compensated by the asymmetrical non-linear spectral phase accumulated in the amplifying optical fiber 6. In a non-linear regime, the spectrum of each input light pulse 3 is shaped by the finite gain-spectrum S3 of the amplifying optical fiber 6. The asymmetry of the finite gain-spectrum S3 of the amplifying optical fiber 6 is imparted to the spectrum S2 of the input light pulses 3.

The waveguide 6 is such that the bandwidth B1 of the input-pulse spectrum S1 is smaller than the bandwidth B3 of the gain spectrum S3. And the bandwidth B2 of the amplified-pulse spectrum S2 is the same or almost the same as the bandwidth B3 of the gain spectrum S3 of the waveguide 6.

The self-phase modulation (SPM) generated in the amplifying optical fiber 6 to the stretched asymmetrical-spectrum light pulses produces an asymmetrical spectral phase. The power $P_L$ of the second pump light flow 5 generated by the second laser pump source 4 is adjusted such that the asymmetrical phase of the amplifying optical fiber 6 compensates for the asymmetrical phase (or the third-order dispersion (TOD)) introduced by the compressor 8.

To enter the non-linear regime, it is necessary to go beyond the limit of the gain spectrum (or gain bandwidth) S3, defined as follows:

$$L > \frac{3}{\alpha} \ln\left(\frac{2\Omega^3 \beta_2^2}{\alpha U_{in} \gamma}\right)$$

where L is the length of the amplifying optical fiber, $\alpha$ is the gain per unit length of the amplifying optical fiber 6, $\Omega/\pi$ is the full width at half maximum of the gain bandwidth S3 of the amplifying optical fiber 6, $\beta_2$ is the group-velocity dispersion, $U_{in}$ is the energy of the input light pulse 3, and $\gamma$ is the non-linear coefficient of the amplifying optical fiber 6.

The amplifying optical fiber needs to have a length greater than a critical length $L_C$, given by the above relation, beyond which the bandwidth B2 of the amplified-pulse spectrum S2 is the same or almost the same as the bandwidth B3 of the gain spectrum S3 of the waveguide 6.

The length L of the amplifying optical fiber 6 depends on the parameters of the input light pulse 3, on the optogeometric characteristics of the amplifying fiber 6, and on the power of the first laser pump source 1.

The amplifying optical fiber 6 comprises a first portion of fiber having a critical length $L_C$, as defined above, over which the input light pulses 3 are transmitted in a parabolic regime, and a second portion of fiber over which the input light pulses 3 are transmitted in a non-linear regime.

The parameters of the amplifying optical fiber 6 are adapted in order to obtain amplified light pulses 7 having a parabolic profile, in this first portion of fiber with critical length $L_C$.

The following example gives parameters of the amplifying optical fiber 6 that can be used for an energy of input light pulse 3 of 2 nJ: L=6.5 m: $\beta_2 \approx 20$ ps$^2$km$^{-1}$, $\gamma \approx 0.7$ W$^{-7}$km$^{-1}$ bandwidth B3 of the gain spectrum S3 $\Delta v_g \approx 10$ THz. The maximum power at the output of the amplifying optical fiber 6 before reaching the limit of the gain-spectral band S3 is 1.8 W (which corresponds to g=0.54 m$^1$, g being the gain per unit length of the fiber). For the maximal pump power ($g_{max}$=0.82 m$^{-1}$), the critical length $L_C$ of the amplifying optical fiber 6 is 3.8 m, far smaller than the 6.5 m that are used. We are thus far beyond the limit fixed by the spectral band S3 of the gain.

The exact parameters of the source of ultrashort light pulses that allow compensating for the third-order dispersion (TOD) may be obtained by the direct experimental measurement, as described above, or by the numerical simulation of the propagation equation (generalized non-linear Schrödinger equation comprising the third-order dispersion term and a non-constant spectral gain), for example based on the Fourier split-step algorithm, as described in G. P. Agrawal, "Nonlinear Fiber Optics", Second Edition, Academic Press, p. 50, 1995.

It is then possible to determine the parameters of the amplifying optical fiber 6 that can compensate for the ratio $\varphi_3/\varphi_2$ (third-order spectral dispersion (TOD)/second-order dispersion) of the compressor 8, which is given by the following relation:

$$\frac{\varphi_3}{\varphi_2} = -\frac{3\lambda}{2\pi c}\left(1 + \frac{\frac{\lambda}{d}\left(\frac{\lambda}{d} - \sin\gamma\right)}{1 - \left(\frac{\lambda}{d} - \sin\gamma\right)^2}\right)$$

where $\lambda$ is the central wavelength, d is the period of the lines of the gratings 10, 10', $\gamma$ is the incidence angle of the light beam at the output of the amplifying optical fiber 6 on the first grating 10, and c is the speed of light in the vacuum.

This relation 3 is known from S. Kane and J. Squier, "Grism-pair stretcher-compressor system for simultaneous second- and third-order dispersion compensation in chirped-pulse amplification", J. Opt. Soc. Am. B. 14, 661(1997).

Because of the shape of the gain, the spectrum S2 of the amplified light pulses 7 is asymmetrically modeled, which results in an asymmetrical spectral phase via the effect of self-phase modulation (SPM). The sign of $\varphi_3$ is reversed and, for a power $P_L$ of the second laser pump source 4 of 19 W, the ratio $\varphi_3/\varphi_2$ compensates exactly for the ratio $\varphi_3/\varphi_2$ of the compressor 8.

It is possible to measure the ratio $\varphi_3/\varphi_2$ of the amplified light pulses 7 before a compression at different output powers ($0.76 \leq g \leq 0.82$ m$^{-1}$), by means of a frequency-resolved autocorrelation system 25 (FROG, "Frequency-Resolved Optical Grating"), collecting a fraction of the light signal of the amplified light pulses 7 through a dichroic mirror 26, arranged between the amplifying optical fiber 6 and the compressor 8. Such a frequency-resolved autocorrelation system 25 (FROG) is known from R. Trebino, K. W. Delong, "Method and apparatus for measuring the intensity and phase of one or more ultrashort light pulses and for measuring optical properties of materials", U.S. Pat. No. 5,530,544 (1996). The measurement may be performed in real time or on a punctual basis.

Figure 2:
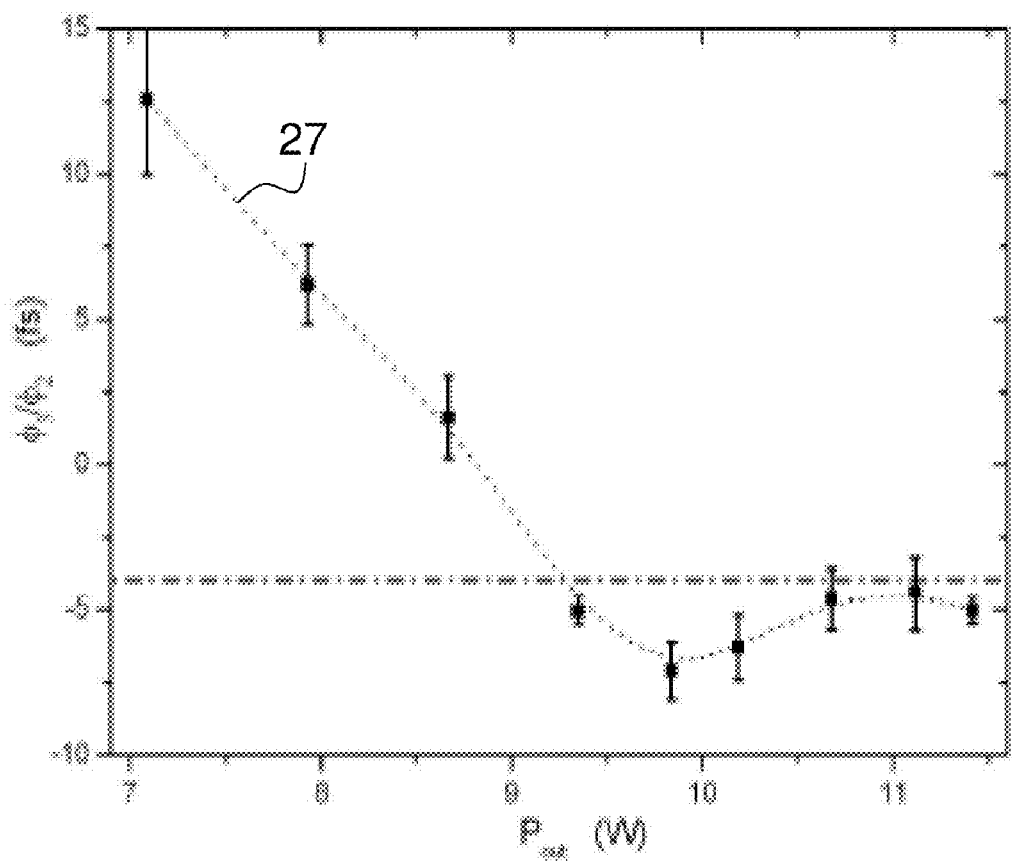
FIG. 2 shows the evolution of the measured ratio $\phi_3/\phi_2$ versus power of the amplified light pulses.

FIG. 2 shows the evolution of the measured ratio $\varphi_3/\varphi_2$ 27 versus power of the amplified light pulses 7 at the output of the amplifying optical fiber 6, varying from 7 to 11.5 W. X-axis represents the power of the amplified light pulses 7 in Watts, and Y-axis represents the measured ratio $\varphi_3/\varphi_2$ in femtoseconds. The evolution of the measured ratio $\varphi_3/\varphi_2$ is only due to the non-linearities of the amplifying optical fiber 6.

The ratio $\varphi_3/\varphi_2$ associated with the compressor 8 being known, it is possible to determine the necessary output power of the amplifying optical fiber 6 and to adjust accordingly the power $P_L$ of the second laser pump source 4, in order to obtain this output power and to have an optimal compensation for the first two orders of dispersion.

In this example, which corresponds to the parameters given in the example of FIG. 1, the compressor 8 comprises two gratings 10, 10', each comprising 1250 lines/millimeter, which fixes the ratio $\varphi_3/\varphi_2$ of the compressor 8 to −4 fs. A high quality of compressed ultrashort light pulses 9 can thus be expected at the output of the compressor 8, from a power of about 9 W at the output of the amplifying optical fiber 6, as can be seen in FIG. 2.

The value of $\varphi_2$ varies quite a little, from 0.073 to 0.065 ps$^2$ (close to the theoretical values of 0.079 to 0.073 ps$^2$ for ideal parabolic light pulses). The value of $\varphi_3$ (expressed in ps$^3$) varies significantly over an order of magnitude, and its sign changes as expected for a power $P_L$ of the second pump light flow 5 of 19 W.

Figure 3:
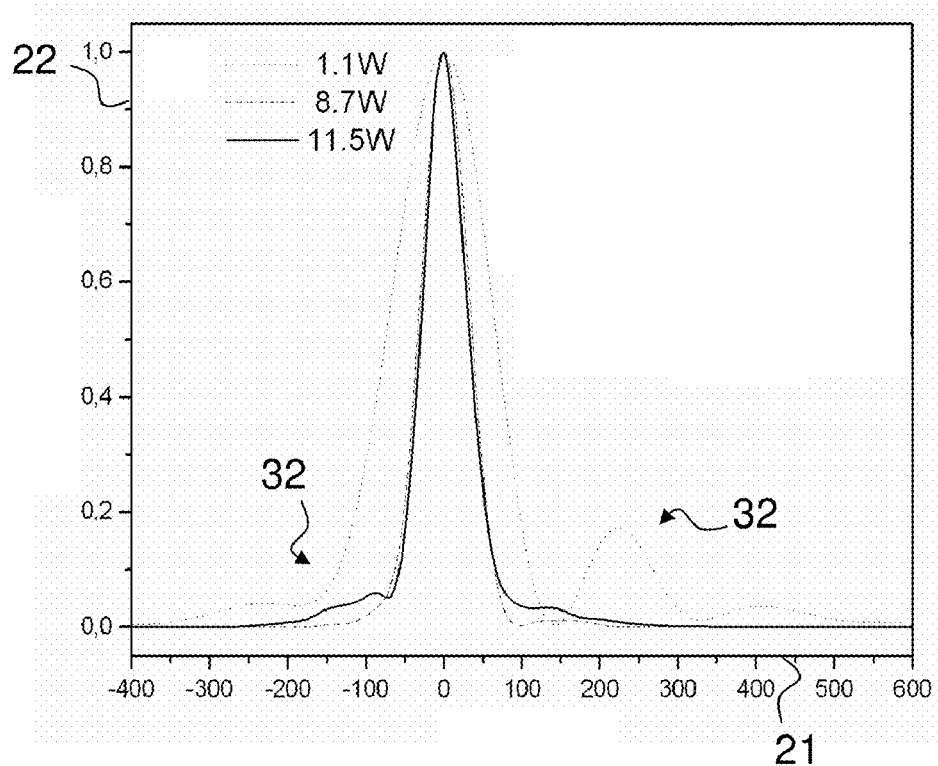
FIG. 3 shows the profile of the compressed ultrashort light pulses versus time.

FIG. 3 shows the profile of the compressed ultrashort light pulses 9 at the output of the compressor 8 versus time, for powers of amplified light pulses 7 of 1.1 W, 8.7 W and 11.5 W.

X-axis 21 represents the time in femtoseconds and Y-axis 22 represents the intensity (in arbitrary units).

For a power of amplified light pulses 7 of 1.1 W (which is under the limit of the gain spectrum S3, corresponding to a power of 1.8 W at the output of the amplifying optical fiber 6), the parabolic compressed ultrashort pulses 9 are not correctly compressed to 143 fs. They show secondary structures 32 (satellites) typical of the presence of third-order dispersion. The power $P_L$ of the second pump light flow 5 of the second laser pump source 4 is 5 W. The bandwidth B1 of the input-pulse spectrum S1 is 15 nm. The bandwidth B2 of the asymmetrical amplified-pulse spectrum S2 is 21 nm.

For a power of amplified light pulses 7 of 8.7 W (corresponding to compressed ultrashort light pulses 9 of 6 W), the compressed ultrashort light pulses 9 are almost perfectly compressed (98% of energy in the main lobe), with a duration of 70 fs, a spectral bandwidth of 31 nm, an energy of 220 nJ, which corresponds to a peak power of 3.5 MW. The power $P_L$ of the second pump light flow 5 of the second laser pump source 4 is 19 W. The bandwidth B1 of the input-pulse spectrum S1 is 15 nm. The bandwidth B2 of the asymmetrical amplified-pulse spectrum S2 is 31 nm.

For a maximal power of amplified light pulses 7 of 11.5 W (corresponding to compressed ultrashort light pulses 9 of 7.8 W), compressed ultrashort pulses 9 of 63 fs are produced, with a spectral bandwidth of 48.5 nm. Although a satellite structure 32 occurs, the quality of the compressed ultrashort pulses 9 is very satisfactory (89% of energy in the main lobe), which leads to an energy of 290 nJ per compressed ultrashort pulses 9 and a peak power of 4.6 MW. The power $P_L$ of the second pump light flow 5 of the second laser pump source 4 is 25 W. The bandwidth B1 of the input-pulse spectrum S1 is 15 nm. The bandwidth B2 of the asymmetrical amplified-pulse spectrum S2 is 48 nm.

Figure 4:
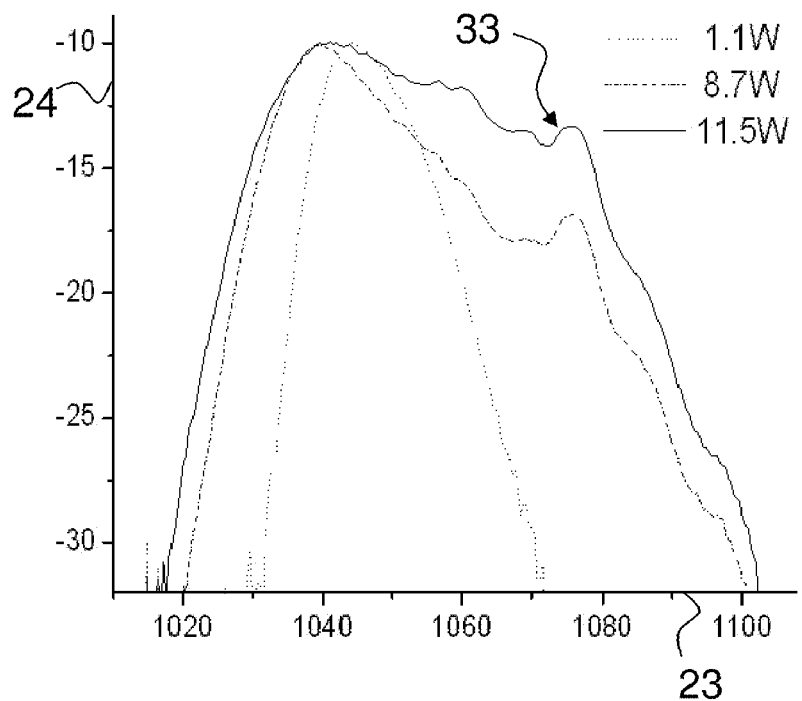
FIG. 4 shows the profile of the compressed ultrashort light pulses versus wavelength.

FIG. 4 shows the spectrum of the compressed ultrashort light pulses 9 at the output of the compressor 8 versus wavelength, for powers of amplified light pulses 7 of 1.1 W, 8.7 W and 11.5 W.

X-axis 23 represents the wavelength in nanometers and y-axis 24 represents the normalized intensity in decibels (dB).

It is thus possible to observe experimentally the shape of the spectrum S2 of the amplified light pulses 7. Beyond a mean power of amplified light pulses 7 of 5 W, an asymmetry occurs, with a steeper slope on the side of short wavelengths, and the development of a spectral content 33 toward the long wavelengths as the power increases.

Figure 5:
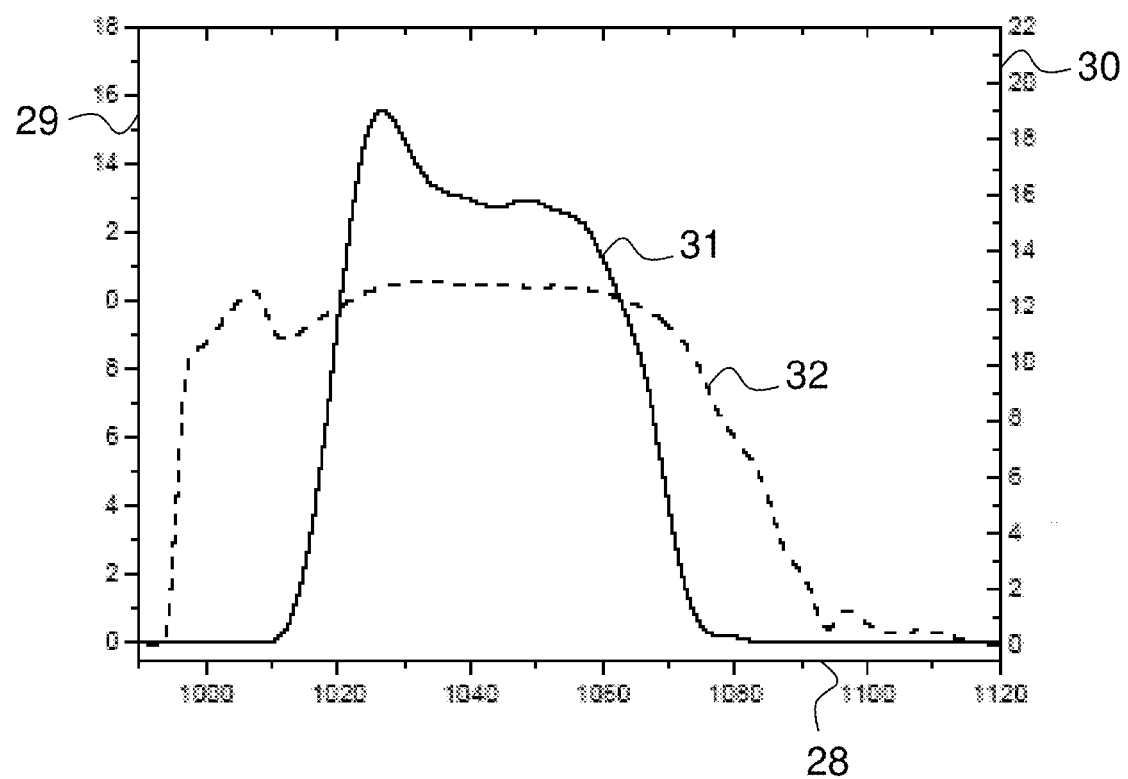
FIG. 5 shows the intensity of the spectrum and of the spectral phase of the compressed ultrashort pulses for amplified light pulses having a maximum power of 11.5 W.

FIG. 5 shows the intensity of the spectrum 31 and of the spectral phase 32 of the compressed ultrashort pulses 9, corresponding to amplified light pulses 7 having a maximal power of 11.5 W.

X-axis 28 represents the wavelengths in nanometers, y-axis 29 on the left of the figure represents the intensity in arbitrary units (a.u.) and y-axis 30 on the right of the figure represents the spectral phase in radian (rad).

The shapes of the spectrum 31 and of the spectral phase 32 of the compressed ultrashort pulses 9 show that the dispersions of order 2 and 3 have been compensated for. The spectral modeling has effectively been performed. The spectral phase 32 is flattened (or flat), as a result of the good compensation between the third-order dispersion (TOD) of the compressor 8 and the non-linear spectral phase acquired in the amplifying optical fiber 6.

In the preceding examples, the means adapted to compensate for the dispersion generated by the compressor 8 compensate for the spectral phases of order 2 ($\phi_2$) and 3 ($\phi_3$), but may also compensate for dispersions of different orders, for example of order 4 or 5.

The above examples show that, for a length L of amplifying optical fiber 6 equal to 6.5 m, the power $P_L$ of the second pump light flow 5 of the second laser pump source 4 may be comprised between 15 W and 25 W, which makes it possible to obtain a correct compensation in this power range.

Thus, it is possible to obtain, at the output of the compressor 8, compressed light pulses 9 with a very high temporal quality and a duration far shorter than it is possible to obtain with CPA system of the prior art. The source of ultrashort light pulses described in the example of FIG. 1 allows generation of compressed ultrashort pulses 9 having a duration of 63 fs, an energy of 290 nJ, a peak power of 4.6 MW, for a rate of 27 MHz and a wavelength of 1050 nm. The compressed light pulses 9 are compressed to a duration shorter than that of the amplified light pulses 7 generated by the amplifying optical fiber 6.

The invention claimed is:

1. Source of high-power ultrashort light pulses comprising:
a first laser pump source (1) adapted to deliver a first pump light flow (12),
a mode-locked laser oscillator (2) adapted to receive said first pump light flow (12) and to deliver ultrashort input light pulses (3), said input light pulses having an input-pulse spectrum S1 with a bandwidth B1,
a second laser pump source (4) adapted to deliver a second pump light flow (5),
a waveguide (6) adapted to receive said second pump light flow (5) and to amplify the input light pulses (3) in a non-linear regime in order to introduce spectral phases in the input light pulses (3), generating ultrashort amplified light pulses (7), having an asymmetrical amplified-pulse spectrum S2 with a bandwidth B2,
a compressor (8) adapted to time-compress the amplified light pulses (7), said compressor (8) generating predetermined spectral phases in the amplified light pulses (7),
characterized in that:
the waveguide (6) consists of a means adapted to compensate for the predetermined spectral phases generated at least by the compressor (8), the second laser pump source (4) being adapted to deliver a second pump light flow (5) having a power $P_L$ such that the spectral phases generated by the waveguide (6) are opposed or quasi-opposed to the predetermined spectral phases generated by the compressor (8), in order to generate, at the output of the compressor (8), compressed ultrashort light pulses (9) with spectral phase,
the waveguide (6) being adapted to amplify the input light pulses (3) in a non-linear regime, said amplifying optical fiber having a length greater than the critical length Lc beyond which the bandwidth B2 of the amplified-pulse spectrum S2 is the same or almost the same as the bandwidth B3 of the gain spectrum S3 of the waveguide (6), and in that the amplifying optical fiber (6) comprises a first portion of fiber having a critical length Lc over which the input light pulses (3) are transmitted in a parabolic regime, and a second portion of fiber over which the input light pulses (3) are transmitted in a non-linear regime.

2. Source of high-power ultrashort light pulses according to claim 1, characterized in that the waveguide (6) has a finite gain-spectrum S3 with a bandwidth B3, said waveguide (6) being such that the bandwidth B1 of the input-pulse spectrum S1 is smaller than the bandwidth B3 of the finite gain-spectrum S3, and the bandwidth B2 of the amplified-pulse spectrum S2 being the same or almost the same as the bandwidth B3 of the gain spectrum S3 of the waveguide (6).

3. Source of high-power ultrashort light pulses according to claim 1, characterized in that the means adapted to compensate for the dispersions generated at least by the compressor (8) compensates for the spectral phases of at least order 2 ($\phi_2$) and 3 ($\phi_3$).

4. Source of high-power ultrashort light pulses according to claim 1, characterized in that the waveguide (6) adapted to amplify the input light pulses (3) in a non-linear regime is an ytterbium-ion-doped amplifying optical fiber.

5. Source of high-power ultrashort light pulses according to claim 1, characterized in that, for a length L of the amplifying optical fiber (6) equal to 6.5 m, the power $P_L$ of the second pump light flow (5) of the second laser pump source (4) is comprised between 15 W and 25 W.

6. Source of high-power ultrashort light pulses according to claim 1, characterized in that:
the first (1) and second (4) laser pump sources are laser diodes each delivering a power of 25 W,
the mode-locked laser oscillator (2) is a femtosecond oscillator comprising a resonant cavity with a length such that the repetition rate of said laser oscillator is 27 MHz, said mode-locked femtosecond laser oscillator (2) delivering ultrashort input light pulses (3) having a duration of the order of one hundred of femtoseconds and an energy that can reach 3.5 nJ,
the length L of the ytterbium-ion-doped amplifying optical fiber (6) is 6.5 m, said fiber (6) having a signal core of 20 μm in diameter and a pump core of 400 μm in diameter,
the compressor (8) comprises two identical transmission gratings (10, 10'), each comprising 1250 lines/mm.

7. Source of high-power ultrashort light pulses according to claim 4, characterized in that the amplifying optical fiber (6) is a polarisation-maintaining fiber.

8. Source of high-power ultrashort light pulses according to claim 4, characterized in that the amplifying optical fiber (6) is a normal dispersion fiber.

9. Source of high-power ultrashort light pulses according to claim 1, characterized in that it comprises an optical modulator, arranged between the mode-locked laser oscillator (2) and the waveguide (6), in order to reduce the repetition rate of the amplified light pulses (7) at the output of said mode-locked laser oscillator (2).

10. Source of high-power ultrashort light pulses according to claim 1, characterized in that it comprises an isolator (11), arranged downstream from the mode-locked laser oscillator (2).

11. Source of high-power ultrashort light pulses according to claim 2, characterized in that the means adapted to compensate for the dispersions generated at least by the compressor (8) compensates for the spectral phases of at least order 2 ($\phi_2$) and 3 ($\phi_3$).

12. Source of high-power ultrashort light pulses according to claim 2, characterized in that the waveguide (6) adapted to amplify the input light pulses (3) in a non-linear regime is an ytterbium-ion-doped amplifying optical fiber, said amplifying optical fiber having a length greater than the critical length $L_c$ beyond which the bandwidth B2 of the amplified-pulse spectrum S2 is the same or almost the same as the bandwidth B3 of the gain spectrum S3 of the waveguide (6).

13. Source of high-power ultrashort light pulses according to claim 2, characterized in that, for a length L of the amplifying optical fiber (6) equal to 6.5 m, the power $P_L$ of the second pump light flow (5) of the second laser pump source (4) is comprised between 15 W and 25 W.

14. Source of high-power ultrashort light pulses according to claim 2, characterized in that:
   the first (1) and second (4) laser pump sources are laser diodes each delivering a power of 25 W,
   the mode-locked laser oscillator (2) is a femtosecond oscillator comprising a resonant cavity with a length such that the repetition rate of said laser oscillator is 27 MHz, said mode-locked femtosecond laser oscillator (2) delivering ultrashort input light pulses (3) having a duration of the order of one hundred of femtoseconds and an energy that can reach 3.5 nJ,
   the length L of the ytterbium-ion-doped amplifying optical fiber (6) is 6.5 m, said fiber (6) having a signal core of 20 µm in diameter and a pump core of 400 µm in diameter,
   the compressor (8) comprises two identical transmission gratings (10, 10'), each comprising 1250 lines/mm.

15. Source of high-power ultrashort light pulses according to claim 5, characterized in that the amplifying optical fiber (6) is a polarisation-maintaining fiber.

* * * * *